US012597964B2

(12) United States Patent
Gupta et al.

(10) Patent No.: US 12,597,964 B2
(45) Date of Patent: Apr. 7, 2026

(54) TIMO: TIME INTERLEAVED MULTIPLE OUTPUTS FOR ENABLING MULTIPLEXING GAINS WITH A SINGLE RF CHAIN

(71) Applicant: The Regents of the University of California, Oakland, CA (US)

(72) Inventors: Agrim Gupta, La Jolla, CA (US); Dinesh Bharadia, San Diego, CA (US)

(73) Assignee: The Regents at the University of California, Oakland, CA (US)

( * ) Notice: Subject to any disclaimer, the term of this patent is extended or adjusted under 35 U.S.C. 154(b) by 0 days.

(21) Appl. No.: 18/722,883

(22) PCT Filed: Dec. 22, 2022

(86) PCT No.: PCT/US2022/082316
§ 371 (c)(1),
(2) Date: Jun. 21, 2024

(87) PCT Pub. No.: WO2023/122776
PCT Pub. Date: Jun. 29, 2023

(65) Prior Publication Data
US 2025/0158667 A1 May 15, 2025

Related U.S. Application Data

(60) Provisional application No. 63/292,630, filed on Dec. 22, 2021.

(51) Int. Cl.
*H04B 7/0413* (2017.01)
*H04B 1/00* (2006.01)
*H04B 7/08* (2006.01)

(52) U.S. Cl.
CPC ......... *H04B 7/0413* (2013.01); *H04B 1/0078* (2013.01); *H04B 1/0096* (2013.01); *H04B 7/0805* (2013.01)

(58) Field of Classification Search
CPC .. H04B 7/0413; H04B 7/0805; H04B 1/0096; H04B 1/0078
See application file for complete search history.

(56) References Cited

U.S. PATENT DOCUMENTS

| | | | | |
|---|---|---|---|---|
| 9,319,058 | B1 * | 4/2016 | Yu | H03M 1/1038 |
| 10,491,264 | B1 * | 11/2019 | Mulvaney | H04J 13/0077 |

(Continued)

OTHER PUBLICATIONS

Gu, Z. et al., "TyrLoc: A Low-cost Multi-technology MIMO Localization System with a Single RF Chain," Proceedings of the 19th Annual International Conference on Mobile Systems, Applications, and Services, (2021).

(Continued)

*Primary Examiner* — Rahel Guarino
(74) *Attorney, Agent, or Firm* — FisherBroyles, LLP

(57) ABSTRACT
In some embodiments, there may be provided systems, methods, and articles of manufacture for timeinterleaved multiple output. In some example embodiments, there may be provided an apparatus including a plurality of antennas; an analog spreader coupled the plurality of antennas; a radio frequency chain coupled to the analog spreader, wherein the radio frequency chain down converts and performs an analog-to-digital conversion to generate a stream; and a digital despreader, wherein the digital despreader receives the stream output by the radio frequency chain and digitally inverts analog spreading caused by the analog spreader to generate one or more user streams. Related systems, methods, and articles of manufacture are also disclosed.

20 Claims, 8 Drawing Sheets

(56) References Cited

U.S. PATENT DOCUMENTS

| | | |
|---|---|---|
| 2004/0077352 A1 | 4/2004 | Mahany |
| 2011/0237196 A1 | 9/2011 | Niu et al. |
| 2017/0019157 A1 | 1/2017 | Mo et al. |

OTHER PUBLICATIONS

Manganaro, G. et al. "Interleaving ADCs: Unraveling the Mysteries," Analog Dialogue 49.7 (2015).

* cited by examiner

TIMO: TIME INTERLEAVED MULTIPLE OUTPUTS FOR ENABLING MULTIPLEXING GAINS WITH A SINGLE RF CHAIN

CROSS REFERENCE TO RELATED APPLICATION

This application is a national stage entry of Patent Cooperation Treaty Application No. PCT/US2022/082316 filed Dec. 22, 2022, entitled "TIMO: TIME INTERLEAVED MULTIPLE OUTPUTS FOR ENABLING MULTIPLEX-ING GAINS WITH A SINGLE RF CHAIN," which claims priority to U.S. Provisional Application No. 63/292,630 filed Dec. 22, 2021, entitled "TIMO: TIME INTERLEAVED MULTIPLE OUTPUTS FOR ENABLING MULTIPLEX-ING GAINS WITH A SINGLE RF CHAIN". The disclosures of which are incorporated herein by reference in their entirety.

STATEMENT OF GOVERNMENT SUPPORT

This invention was made with government support under 0065592 awarded by the National Science Foundation. The U.S. Government has certain rights in the invention.

BACKGROUND

The adoption of wireless technologies has led to an ever increasing demand for serving more and more devices with never ending throughput demands. To meet these demands for each device with scarce spectrum, multi-user multiple input multiple output (MIMO, mu-MIMO) technologies have been introduced to enable spectrum efficient and con-current multi-user communications. The idea was simply to use the same spectrum to serve K users by utilizing M (which is equal to K) antennas (which creates K independent spatial streams one for each user). In practice however, this M K MIMO system has failed to consistently deliver mul-tiplicative gains entailed by enabling multi-user transmis-sions. A reason may be that often the M antennas have correlated channels for users, so the antennas do not provide independent channels as theoretically conceived. Away to mitigate this problem and serve K users robustly is to use massive MIMO (where M antennas is much greater ($\gg$) than the number of user streams). Massive MIMO is a technology that can scale to multiple users using a massive number of antennas.

SUMMARY

In some embodiments, there may be provided systems, methods, and articles of manufacture for time-interleaved multiple output. In some example embodiments, there may be provided an apparatus including a plurality of antennas; an analog spreader coupled the plurality of antennas; a radio frequency chain coupled to the analog spreader, wherein the radio frequency chain down converts and performs an analog-to-digital conversion to generate a stream; and a digital despreader, wherein the digital despreader receives the stream output by the radio frequency chain and digitally inverts analog spreading caused by the analog spreader to generate one or more user streams.

In some variations of the methods, systems, and computer program products, one or more of the following features can optionally be included in any feasible combination. The analog spreader comprises a plurality of radio frequency switches. Each of the plurality of radio frequency switches toggles on or off a radio frequency signal obtained from one of the plurality of antennas. The plurality of radio frequency switches are toggled on or off under the control of a control signal, wherein the control signal synchronizes the analog spreader, the radio frequency chain, and the digital despreader. The digital despreader digitally inverts analog spreading caused by the analog spreader to generate the one or more user streams by at least deinterleaving interleaved samples to generate one or more user steams. The radio frequency chain comprises a single radio frequency chain coupled to the plurality of antennas. The radio frequency chain comprises a first single frequency chain coupled to a first set of the plurality of antennas and a second single frequency chain coupled to a second set of the plurality of antennas The plurality of antennas comprise a multiple input multiple output antenna array. The multiple input multiple output antenna array is configured to enable beamforming, wherein the control signal turns on a first set of the antennas of the multiple input multiple output antenna array and turns off a second set of the antennas of the multiple input multiple output antenna array to enable reception of a first beam, such that the digital despreader outputs a first user stream, and wherein the control signal turns on the second set and turns off the first set to enable reception of a second beam, such that the digital despreader outputs a second user stream. The radio frequency chain is virtualized, such that the radio frequency chain is shared among at least a portion of the plurality of antennas and at least a portion of the one or more user streams generated by the digital despreader. Each of the plurality of radio frequency switches is directly coupled to one of the plurality of antennas, wherein the direct coupling does not include an active component. The radio frequency chain comprises a low noise amplifier coupled to a mixer that down coverts the outputs of the plurality of radio frequency switches, wherein the mixer is further coupled to an analog-to-digital converter that generates the stream including time interleaved samples.

The details of one or more variations of the subject matter described herein are set forth in the accompanying drawings and the description below. Other features and advantages of the subject matter described herein will be apparent from the description and drawings, and from the claims.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the draw-ings.

DETAILED DESCRIPTION

Although massive MIMO is a technology that can scale to multiple users using a massive number of antennas, an important reason for the lack of deployment of massive MIMO systems is the complex, power-hungry hardware and power requirements due to the large number of radio frequency (RF) chains needed to implement massive MIMO.

In some embodiments, there is provided a system that time interleaves signals from a plurality of antennas using switches, such that only a single RF chain is needed. In order to use only a single RF chain for the antennas, the system use switches (also referred to as RF switches) that toggle on and off in accordance with a control signal (e.g., a synchronized pattern, signature, a square wave control signal, and/or the like) and a single RF chain that includes an analog-to-digital (ADC), such as a high sampling-rate ADC that is also in synchronization with the switches. In this way, the system may capture multiple RF signals received by the antennas, and these RF signals are interleaved (or spread) in time, for example. And, the system uses a single RF chain to virtually serve a plurality of antennas and thus avoid the need to have a plurality of RF chains for the plurality of antennas. The system's novel multi-antenna architecture may be used to provide massive MIMO using only a single RF chain that is shared by the antennas. As the system time interleaves in the analog domain the RF signals received from the plurality of antennas, the system is also referred to herein as a time-interleaved multiple output (TIMO) system.

In some embodiments, the system includes a plurality of RF switches, each of which is coupled directly to a corresponding RF antenna. The RF switches toggle in sync with for example a high sampling-rate ADC, allowing the system to capture multiple antenna signals interleaved across time, such that the interleaved antenna signals are provided to a single, physical RF chain, which essentially virtualizes this single, physical RF chain so it can be used across the plurality of antennas.

Figure 1A:
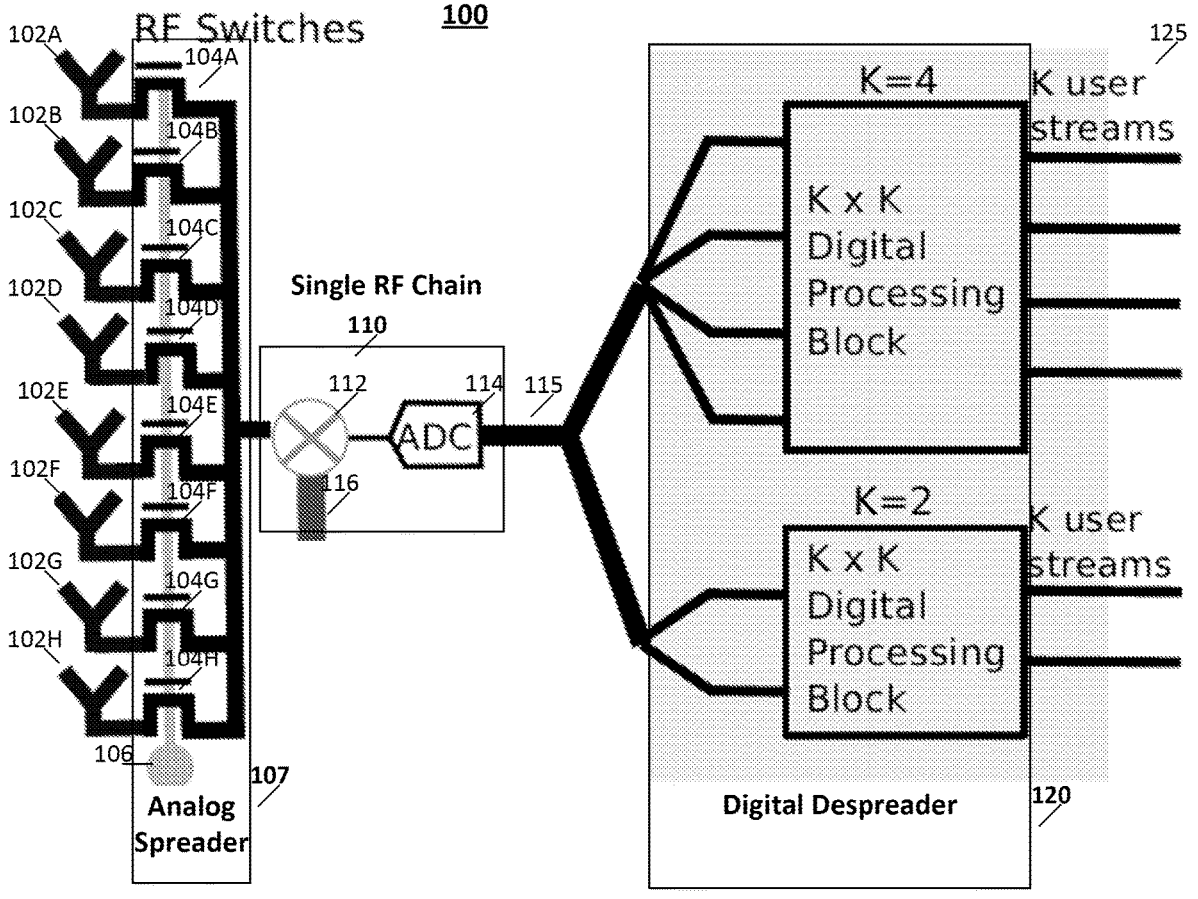
FIG. 1A depicts an example of a system implementing time interleaving and a single radio frequency (RF) chain, in accordance with some embodiments.

FIG. 1A depicts an example of a system 100, in accordance with some embodiments. The system includes a plurality of antennas 102A-H. Each of the plurality of antennas 102A-H are coupled to a corresponding one of the switches 104A-H (labeled RF switches). Specifically, an input of each of the switches is coupled to an antenna output where an RF (or antenna) signal is present. The switches are each controlled to toggle "on" (e.g., allowing the RF signal received at antenna input to pass through the switch) or "off" (e.g., preventing the RF signal received at antenna input to pass through the switch) using a control line 106. The toggling of the switches 104A-H may be under the control of the control line 106 to toggle the switches according to a pattern (or signature). The RF switches may capture (e.g., sample) multiple RF signals received by the antennas and interleave (or spread) in time the signals. The RF switches 104A-H and control line may be referred to herein as an analog spreader 107 as the RF switches operate in the analog domain and spread (e.g., interleave) the RF signal inputs.

The output of each of the switches 104A-H is coupled to a single RF chain 110. This single RF chain may include a mixer 112 (having a local oscillator signal 116) that provides for example down conversion. The mixer's output is coupled to an analog—to digital converter (ADC) 114. The RF chain may include other components as well. For example, a low noise amplifier (LNA) may be included in the RF chain, such as before the mixer 112. Alternatively, or additionally, the RF chain may include a summing circuit before the mixer to sum the outputs of the switches. The system 100 may also include a digital despreader 120. The digital despreader that takes, as an input, the ADC 114 output 115 (which includes a down converted, digitized time interleaved signal an example of which is depicted at plot 200 of FIG. 2) and deinterleaves the output 115 into Kuser streams 125.

Although FIG. 1A depicts an example with 8 antennas, 8 switches, and 6 user streams, this is only an example for purposes of describing the system 100 as other quantities of antennas, switches, and user streams may be implemented as well. Moreover, although FIG. 1A shows a single radio frequency chain shared among all of the plurality of antennas, the single RF chain may be shared by a portion of the antennas. For example, the single radio frequency chain 110 may be shared among antennas 102A-C, while a second (single) RF chain may be shared among antennas 102D-H.

Figure 1B:
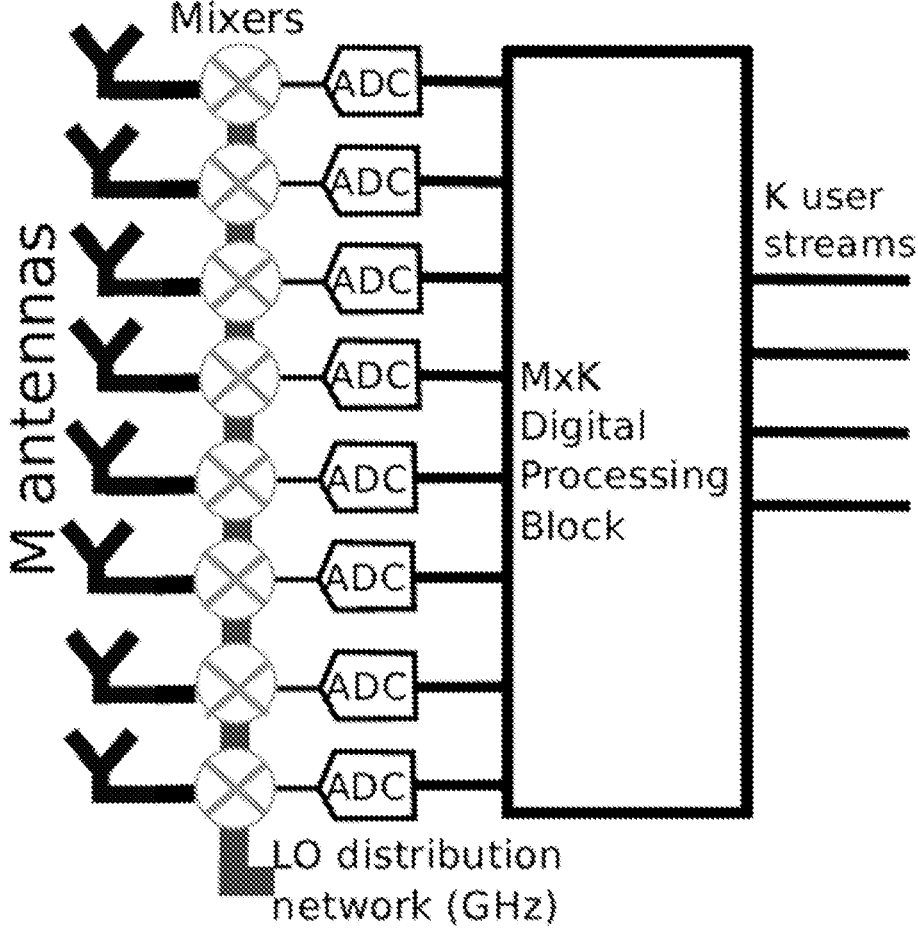
FIG. 1B depicts an example of a MIMO system without time interleaving and the single radio frequency (RF) chain, in accordance with some embodiments.

Unlike a traditional massive MIMO systems having an RF chain for each antenna (as shown in the example of FIG. 1B where each of the M antennas includes an RF chain including a mixer, an ADC, and/or other components such as LNAs and the like), the system 100 includes a single RF chain 110. As noted, the system 100 is able to use a single RF chain 110 due in part to the analog spreading (e.g., time interleaving) provided by the analog spreader 107 (e.g., switches 104A-H). To illustrate by way of an example, the system 100 may be used at, for example, a base station (or other type of access point, user equipment, or RF device) to provide multiplexing gain while just requiring a single RF chain 110 connected to the multi-antenna array of 102A-H. The use of the single RF chain 110 may thus save power, when compared to the traditional massive MIMO system as depicted in FIG. 1B (which requires an RF chain for each antenna). Indeed, as the quantity of antennas increases, the system 100 can accommodate extra antennas by adding switches (as well as adjusting the control signal(s) for switch toggling and corresponding ADC and digital despreader) using the single RF chain, while the traditional massive MIMO systems of FIG. 1B for example, would require the addition of an RF chain for each antenna.

In operation, the switches 102A-H of FIG. 1A are controlled to toggle on and off synchronized with sampling of the ADC 114. By synchronizing the toggling of the switches on and off across time with the ADC sampling (e.g., at MHz rates), the system 100 captures the RF signals from all of the antennas 102A-H using a single physical RF chain 110.

Figure 2:
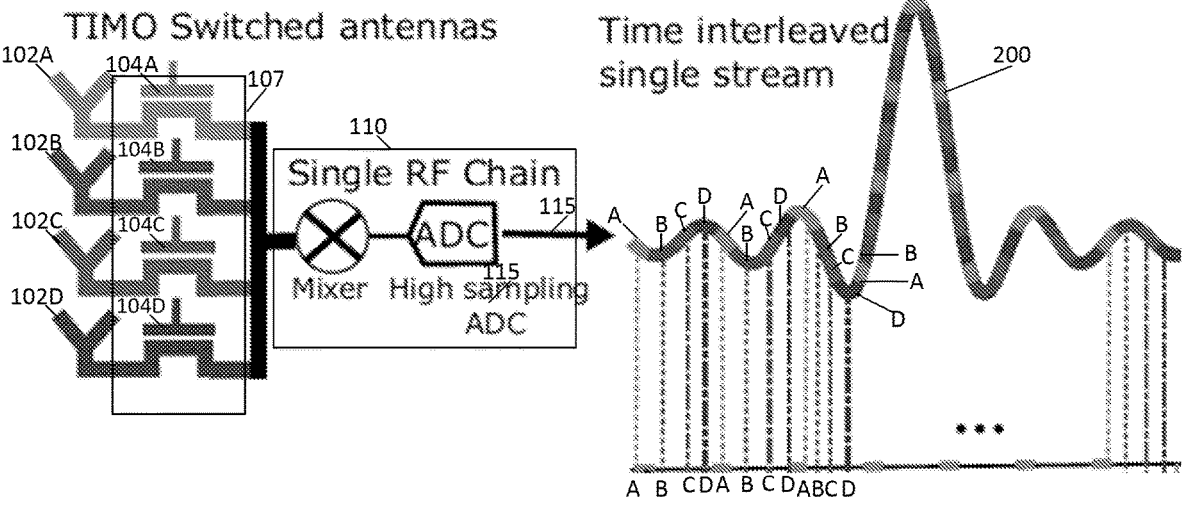
FIG. 2 depicts a portion of the system of FIG. 1A and further depicts a plot of a time interleaved output of the single RF chain, in accordance with some embodiments.

FIG. 2 depicts a portion of the antennas 102A-D, switches 104A-D, the single RF chain 110, and a plot 200 of the time interleaved output 115 of the RF chain 110, in accordance with some embodiments. The switches toggle on and off such that that the sampled values from each on time of a switch is then provided to the RF chain 110 to allow the ADC (which is in sync with the on time of the switches) to capture that on time (and thus the capture a sample of the signal at the switch). The plot 200 shows the time interleaved signal including sampled portions from each of the RF signals from each of the antennas. For example, the As at plot 200 correspond to the samples from antenna 102A and switch 104A after processing by the RF chain 110, the Bs at plot 200 correspond to the samples from antenna 102B and switch 104B after processing by the RF chain, the Cs correspond to the samples from antenna 102C and switch 104C after processing by the RF chain, and the Ds correspond to the samples from antenna 102D and switch 104D after processing by the RF chain, and so forth repeating though the switches 104A-D.

Referring again to FIG. 1A, the following provides additional description for the analog spreader 107 including the RF switches 104A-H.

To realize the analog spreader 107 provided by the RF switches 104A-H, the RF switches are coupled directly to the antennas in the analog RF domain before the signals from the antennas have been combined. In some embodiments, the direct coupling means the switch is directly coupled to the antenna without any active components, such as LNAs, mixers, and/or the like, between the switch and antenna. In some embodiments, the analog spreading 107 circuit elements (e.g., switches) may be implemented using low power consumption components, such as RF switches having low insertion losses (e.g., less than 1 dB). The low power consumption of the analog spreader enables the front end (e.g., antennas and switches) to be passive in the sense that active devices (e.g., LNAs, mixers, ADC, etc.) are not used in the front end. Instead, the active component(s) are included in the single RF chain 110.

The switches 104A-H may comprise RF switches operating at RF frequencies so toggling a switch on allows the RF signal from a corresponding antenna to pass and toggling a switch off impinges (or prevents) the RF signal to pass to the switch's output. For example, the toggling may be performed periodically (or in accordance) with a square wave control signal(s) at 106 to turn the switches on and off. If the toggling is performed periodically, the square wave control signal (or signature) at a given frequency creates harmonics.

To illustrate the RF switches 104A-H operating as the analog spreader 107, the signal at an antenna may be represented as $s(t)$, which goes through an RF switch that toggles a periodic on-off square wave $(c(t))$. Due to switching, multiplication in time domain $s(t)c(t)$ corresponds to convolution in frequency domain $S(f)*C(f)$. If we take a $1/B$ time period on off sequence $c(t)$, it will have a fundamental frequency as B. The active power draw in an RF switch would be $O(B)$ instead of $O(f_c)$, since the time period is $1/B$. As a consequence, the RF switch would work at orders of magnitude lower power than downconverters at each antenna that require local oscillator (LO) clocks with time period $1/f_c$. Thus, the RF switches are able to work at the RF level and with minimal power requirements with respect to insertion losses and active power draw. The B frequency on-off control signal (e.g., at 106) will, however, have harmonics at integral multiples of B that spreads the signal much beyond the Nyquist period [−N B/2, NB/2]. The spreading beyond Nyquist may be handled using a low pass filter for the band of interest [−2B, 2B] before sampling to eliminate these copies altogether, although this would waste the signal power available in the filtered out portions. Alternatively, the nonlinearities created by switching may be leveraged via the sampling process. By sampling at NB rate (e.g., where N represents number of users (or user streams) and B represents bandwidth allocated to a given user), a $1/N$ duty cycled code of B frequency creates equal harmonics at integral frequencies in the required Nyquist range. By sampling via a ADC (which may have a bandwidth of NB, i.e., N times B) for example, these harmonics fold on top of each other so as not to waste the received signal power. In short, while serving N users, using RF switches, we can make use of the required NB bandwidth to handle these N users by spreading each antenna signals into this wide bandwidth via RF switches at minimal power overhead and efficiently without losing signal power. This is possible by duty cycling of the clock switching at 106, such that the created harmonic distortions alias on top of each other to make the spreading process efficient.

Referring to the digital despreader 120 of FIG. 1A, the digital despreader 120 operates in the digital domain to isolate (e.g., despread or deinterleave) the N individual per-antenna signals in the output 115 of the single RF chain 110 and to generate the K user streams 125. For example, the digital despreader may (under the control of a control signal, such as control signal 106) sample portions of the output 115 of the ADC 114 to form each of the K user streams.

With the digital despreader 120, the NB bandwidth allows creation of N time-orthogonal spreading codes, which can then be despread as these codes do not overlap with each other. Each of these orthogonal spreading codes have $1/N$ duty cycle and a same frequency B, however with different initial phases. As a consequence, when these codes are sampled with NB bandwidth, these codes basically represent different sample indexes in time domain since each time sample occupies $1/NB$ time, and because of $1/N$ duty cycling, each spreading code turns on for different on-off times to sample the signal output of an antenna.

Figure 1C:
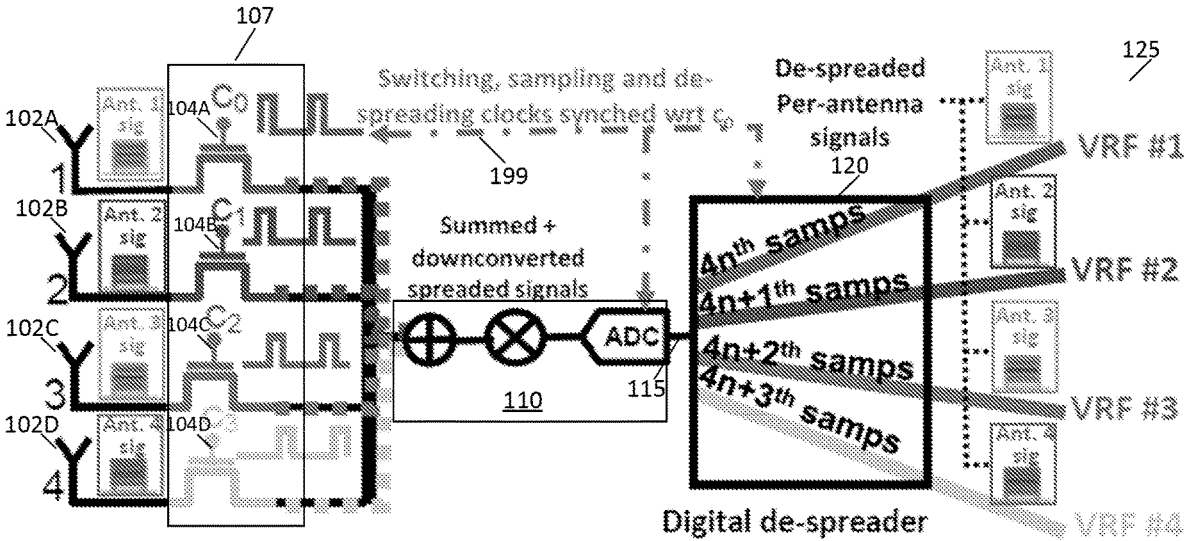
FIG. 1C depicts the system of FIG. 1A and further illustrates a digital despreader, in accordance with some embodiments.

FIG. 1C depicts system 100 of FIG. 1A but further illustrates the despreading aspect of the digital despreader 120. The control signal $c_0$ is on for every Ni samples, the control signal $c_1$ is on for Ni+1 samples, and so forth. The digital despreader 120 isolates these N samples to invert the codes (such as the codes or signatures used to generate the control signal 106 for spreading at 107) since by collecting every Ni+j samples, the digital despreader removes the off samples and preserves only the on samples (and removes the harmonics and preserves only the modulated content). However, this requires sampling synchronization with respect to a particular $c_1$, which in the example of FIG. 1C is control signal $c_0$ is chosen (although another reference signal or clock signal may be used to synchronize the RF switches 107, single RF chain 110, and digital despreader 120). In this example, we ensure this sampling synchronization by deriving $c_0$, and other clocks from a reference signal, such as a device clock or sampling clock. As shown at FIG. 1C, the switching of the RF switches, the ADC, and the despreader are all synchronized to a common clock signal, such as $c_0$ as shown by 199. *In some embodiments, the despreader* 120 may also perform phase correction. For example, the despreader may sample the output 115 of the ADC to select (or deinterleave) the portions for each of the K user streams (which in the example of FIG. 1C is 4). In some embodiments, the despreader may also perform phase correction among the K streams. For example, the phases of the streams 2-4 may be corrected or adjusted with respect to the 1 stream and the control signal $c_0$.

Similarly, the digital despreader 120 may despread (or deinterleave) by inverting the codes (such as the codes or signatures used to generate the control signal 106 for spreading at 107) in the frequency domain. When the Fourier transform of these discrete sequences are taken, though the magnitude spectrum is identical, i.e. all the N codes show N delta functions at every integral multiple of B between [−NB/2, NB/2], the phase response is distinct because of different initial phases. Each $c_i$ shows a different phase at these delta functions, with the phases following a routes of unity sequence, like $c_i$ has phases $$\frac{\pi}{n} * i * j$$

for different j denoting the N delta functions (e.g., −NB/2, −(N−1)B12, . . . (N−1)B/2).

Figure 1D:
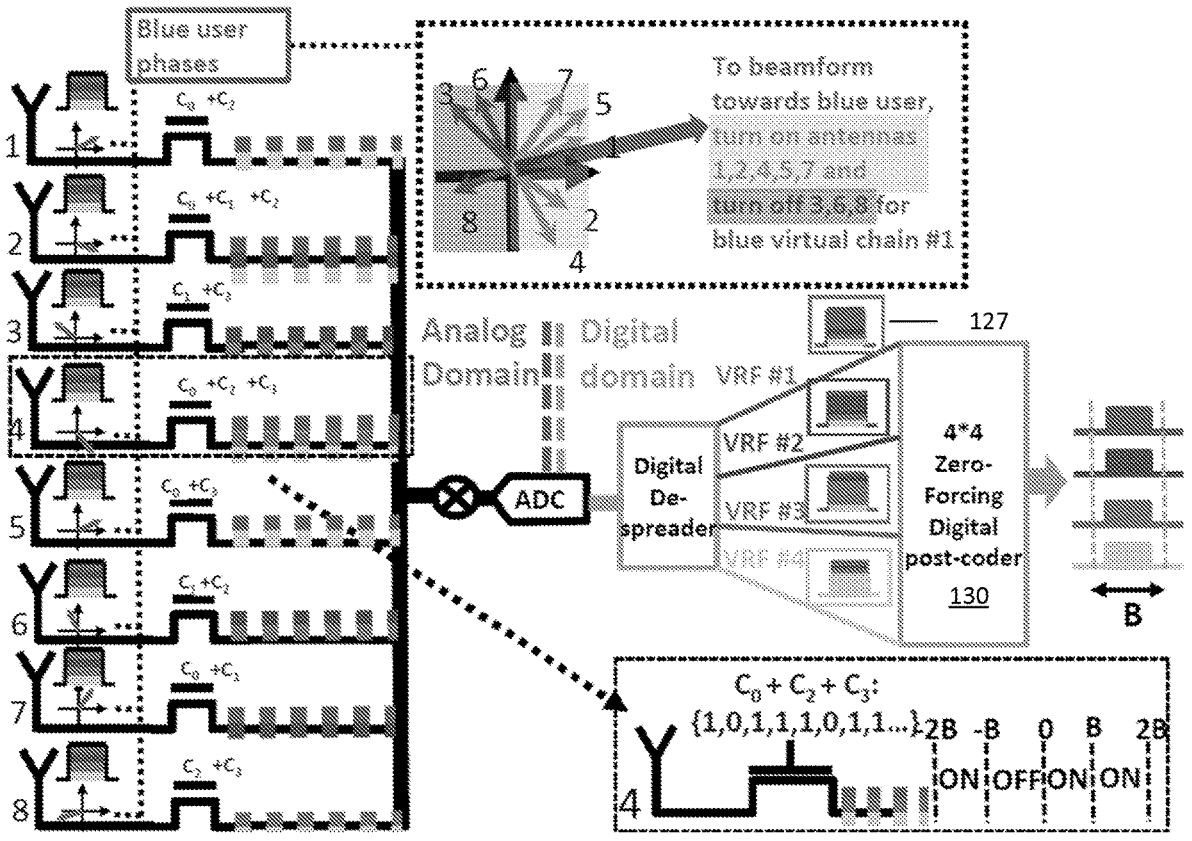
FIG. 1D depicts the system of FIG. 1A and further includes beamforming, in accordance with some embodi-ments.

The system 100 may be used to turn on multiple antennas at the same time, an example of which is depicted at FIG. 1D. In the example of FIG. 1D, the RF switches are controlled to for example turn on multiple antennas at the same time, such as antennas 1, 2, 4, 5, 7, while turning off some antennas (e.g., antennas 3, 6, and 8) to provide beamforming towards a first user 127, for example. At 130, a 4 by 4 zero forcing digital post coder (e.g., a MIMO pre-coder or MIMO post coder) may be used to beamform towards a user (or, e.g., user stream), while at the same time configuring the array for different configurations for other users. The system 100 may thus be used to provide a highly flexible architecture that can achieve digital beamforming without requiring extensive down conversion chains and can flexibly change the sampling rate to adapt the number of user streams (e.g., the interleaved "virtual" RF chains) per demand, which may save energy. Moreover, the system 100 may generalize to a large number of M antennas connected to fewer K virtual RF chains (by mimicking analog combining of M>K signals from each of the antennas) to form K output signals summed from different antennas combination before being sampled in the digital domain for virtual RF chain creation. This allows the system to achieve networks like hybrid beamformers and avoid issues of hybrid beamformers by flexibly choosing higher sampling rates as necessary for the channel, which may eliminate fixed K physical RF chains requirement. Moreover, the binarized analog beamforming (BABF) algorithm (which uses the constructive combining gains from multiple antennas per virtual RF chain) to create uncorrelated digital channels.

The system 100 may create so-called "virtual" RF chains. The virtual RF chains refer to a single, physical RF chain 110 supporting a plurality of RF antennas (M) and the corresponding user streams (K). Assuming for example the system 100 attempts to handle K-users by creating K virtual RF chains interleaved samples of a single down converted (e.g., by mixer 112) stream sampled by the ADC 114 sampling K times faster the bandwidth of the users, B (e.g., as depicted at plot 200 of FIG. 2). Before generalizing to M>K scenario, the following uses an example case of K=4 for brevity of explanation.

In the example of K=4 virtual RF chains, the sampling at 4B to decode a B bandwidth user, there are 4 extra time slots, and for these 4 extra slots, the switches can toggle different antennas on-off using RF switches to capture the different antenna's RF signal in each of the 4 slots. That is, say if we had a bandlimited signal x[n], we oversample it by 4 times to obtain y[n]. To downsample y[n] now, we have 4 possible ways, we can do $y_0[n]=y_1[n]$, $y_1[n]=y_2[n+1]$,$y_2[n]=y[4n+2]$, $y_3[n]=y[4n+3]$. Each of these $y_k$'s can be independently used to recover the original signal x[n]. Different antennas are switched on (e.g., under the control of control signal 107) for these different sampling instants corresponding to each of the 4 $y_k$'s and use the sampling instants as virtual RF chains interleaved over time. For example, the first switched antenna may be on for 0, 4, 8, . . . , 4n-th samples, the second switched antenna may be on for 1, 5, 9, . . . , 4n+1-th samples, and so on. So each $y_k$ may be seen as a virtual RF chain for antenna k. To understand how this virtual RF chain actually captures the wireless channel at k-th antenna, let us model the scenario with K=4 users transmitting signals as $x_i(t)$, i ∈ {1,2,3,4}, and the complex time-invariant channel seen by user i to the k-th antenna represented as $h_{ik}$. We also know that at any time instant, t, each of the RF switches for the $k^{th}$ antenna is either on or off, which we can model as the switching signal $s_k(t)$ ∈{0, 1} The combined interference signal y(t) due to the 4 users indexed via i, and 4 switched antennas indexed via k, can be represented as:

$$y(t) = \sum_{i=1}^{4}\sum_{k=1}^{4}(h_{ik}(t) * x_i(t)) \cdot s_k(t). \quad (1)$$

This combined signal y(t) then goes through one single downconversion at mixer 112, and a single ADC 114 sampling at $4B_t$ to get one single combined digitized signal, y[n] as follows:

$$y[n] \equiv y(nT_s) = \sum_{i=1}^{4}\sum_{k=1}^{4}(h_{ik}[n] * x_i[n]) \cdot s_k[n]. \quad (2)$$

Figure 3:
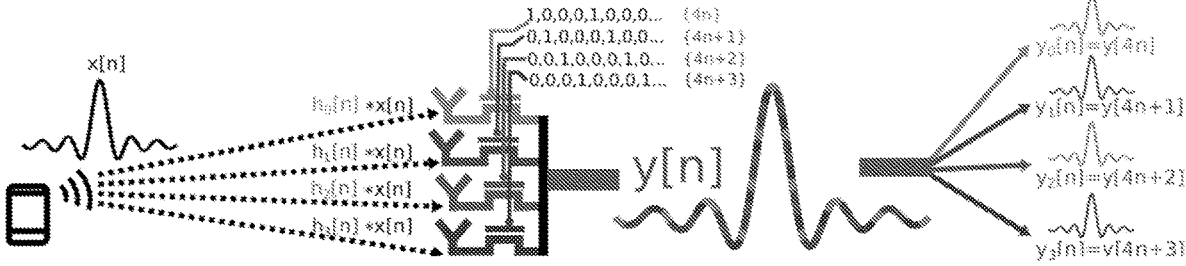
FIG. 3 depicts the RF switches and their connection to the antennas, in accordance with some embodiments.

To despread the individual virtual RF-chain signals $y_k[n]$, k ∈ {1,2,3,4} (e.g., the A at plot 200 of FIG. 2), the control of the switches ensures that only antenna 1 102A is on for every 4n-th sample corresponding to $y_0$ and off for 4n+k, ∈ {1,2,3}-th samples and so on. This control may be provided by choosing the switching sequence (or vectors) $s_k[n]$, k ∈ {1,2,3,4} as $s_1[n]=[,0,0,0]_n$, $s_2[n]=[0,1,0,0]_n$, $s_3[n]=[0,0,1,0]_n$ and $s_4[n]=[0,0,0,1]_n$, where $[\cdot]_n$ shows that the sequence gets repeated, that is $s_1[n]=1,0,0,0,1,0,0,0, . . .$ , which is depicted at FIG. 3. FIG. 3 shows that the RF switches connect the i-th antenna to every 4n+i-th samples to create the time interleaved virtual RF chains $y_i$ from the single sampled stream y[n]. In other words, the oversampled signal y[n] is interleaved with samples from each of the antennas. The K=4 virtual RF chains, $y_1,y_2,y_3,y_4$ may be expressed as $$y_k[n] = \sum_{i=1}^{4}(h_{ik}[4n+k] * x_k[4n+k])s_k[4n+k] \quad (3)$$

$$= \sum_{i=1}^{4}(h_{ik}[4n+k] * x_k[4n+k])$$

-continued $$\approx \sum_{i=1}^{4}(h_{ik}[4n] * x_k[4n + k]),$$

wherein the second step follows from $s_k[4n+k]$ being equal to 1 from definition, and the last step assumes that the wireless channels $h_{ik}[4n] \approx_{ik}[4n+1] \approx h_{ik}[4n+2] \approx h_{ik}[4n+3]$, which is generally true as the coherence time for channels is usually much larger than duration of 4 samples. The k-th virtual RF chain $y_k$ effectively consists of the convolution of all the K users signals with channels between the users and the k-th antenna since only k-th antenna is on for the samples used to derive $y_k[n]$ from the single combined stream $y[n]$. Although the examples refer to a case where M K=4 for brevity of explanation, the examples described can are not limited to 4.

Herein, is described that the virtual RF chains $y_k$ may be obtained by utilizing the switching sequences $s_k$ which can be used to control the RF switches as well as enable the depreading by the digital despreader. Before describing the despreading of the virtual RF chains, the following generalizes the K interfering users and M>K number of antennas. This generalization reveals how the system's 100 single-RF chain architecture can behave as a digital beamformer (as well as a hybrid beamformer) for multi-RF chain MIMO settings. To understand how the single-RF chain based system architecture can perform the same as a physically laid multi-RF chain digital or hybrid beamformer, we first generalize the system's 100 combining to M>k setting and understand how the system can identify $y_k[n], k=1, 2, \ldots, K$. First, let us stack up the switching sequences as rows of a combined M×K switching matrix S. An element $s_{int} \in \{0,1\}$ in the matrix S now represents the on-off states for each of the m=1, 2, 3, . . . , M antennas for k=1, 2, 3, . . . , K virtual RF chains. Referring to the example above, S is an identity matrix where only one antenna was on at a time. More generally, with i indexing i=1, 2, . . . K users, m indexing 1, 2, . . . M antennas and k indexing 1, 2, . . . K virtual RF chains, Equation (3) can be expressed as $$y_k[n] = \sum_{i=1}^{K}\sum_{m=1}^{M}(h_{im}[Kn] * x_i[Kn + k]) \cdot s_{mk}, \quad (4)$$

and since $s_{mk}$ can be either 0 or 1 for each antenna m and is independent of the user's transmission Equation (4) can be expressed as $$y_k[n] = \sum_{i=1}^{K}\left(\left(\sum_{m=1}^{M}h_{im}[Kn]s_{mk}\right) * x_j[Kn + k]\right), \quad (5)$$

To simplify the analysis and to draw easier equivalences with the digital and hybrid beamforming, the frequency domain (via for example a Fourier transform) representation may be used as follows:

$$Y_k[f] = \sum_{i=1}^{K}\left(\left(\sum_{m=1}^{M}\tilde{H}_{im}[f]s_{mk}\right)\mathscr{F}(x_i[Kn + k])\right), \quad (6)$$

wherein $\tilde{H}_{im}[f]$ represents the Fourier transform of channel $h_{in}[n] \approx h_{im}[kn] \approx h_{im}$ [kn+1] . . . $\approx h_{im}[Kn+K-1]$. since the channel is assumed to be stationary for every K samples. For brevity, the tilde is dropped from the expression and write it simply as $H_{im}[f]$. The expression $\mathscr{F} x_i(Kn+k)=e^{j2\pi f}\mathscr{F}$ $xu[kn]=e^{h2\pi j}Xi[f]$ may be expressed by using Fourier identities for time delayed signals and using the fact that $x_i(t)$ has been oversampled by K times, so the following simplified equation is formed:

$$Y_k[f] = \sum_{i=1}^{K}\left(\left(\sum_{m=1}^{M}H_{im}[f]s_{mk}\right)e^{j2\pi fk}X_i[f]\right). \quad (7)$$

Here, $$\sum_{m=1}^{M}H_{im}[f]s_{mk}$$

is nothing but the (i, k)-th element in the matrix multiplication between K×M channel matrix H[f], and the M×K switching matrix S. For $Y_k$, we remove the phase due to group delay in the Fourier transform, which can be done by multiplying $Y_k$ by $e^{-j2zfk}$, and we can write the delay compensated vector $\mathbf{y}^{\mathscr{B}}[f] = [Y_0[f]Y_1[f]e^{-j2zf} \ldots Y_{K-1}[f]e^{-j2\pi(K-1)}]^T$. This vector $\mathbf{y}^{\mathscr{B}}[f]$ consists of phase delay compensated Fourier transforms of $y_k[n]$ which were obtained by collecting Kn+k samples in the oversampled signal y[n]. Denoting X[f] to be $[X_1[f]X_2[f] \ldots x_k[f]]^T$. to get a much simpler equation in terms of matrix products, $$\mathbf{y}^{\mathscr{B}}[f] = (H[f]S)X[f]. \quad (8)$$

Equation (8) may be considered akin to what hybrid analog-digital beamformers use, since S here is implemented by the analog switching network, and we observe the HS equivalent K×K channels with digital streams that can then be combined digitally. In digital beamforming systems with M=K, we obtain $y_r[n]$ for each of the r-th RF chains, r=0, 1, . . . K-1, we get the equation $$Y^{RF}[f] = H[f]X[f]. \quad (9)$$

For M=K case, we can set the switching matrix S to be an identity matrix, we get a clear performance equivalence between the system 100 and traditional digital beamforming, even though the system implements S in analog domain using RF switches. However, having M K is not a very robust operating point to serve K users, since the channel may not always be full rank. Hence, M may be greater than (>) K in order to serve K users. A benefit of having M>K antennas for K virtual RF chains is that this allows us to harden the multiplexing gains of K for any user configuration, irrespective of the underlying channels for the K users.

The system 100 may generalize to M>K antenna scenario as shown at FIG. 1D, for example while hardening the multiplexing gains by Kx with a single RF-chain. Equation (8) above shows that when there are K users and M (>K) antennas the equivalent channel H[f]S still remains K by K, and the digital combining part operates on this K by K equivalent channel H[f]S. The matrix S may be configured (or selected) in a way such that the digital combining operates on a full rank, uncorrelated K by K equivalent channel in order to increase the performance. To achieve this full-rank equivalent channel matrix H[f]S, S is chosen. To choose S, there are $2^{M \times K}$ possible choices as each of the M antenna can be turned on/off for each of the K slots. Hence, a brute force optimization would not be scalable (e.g., considering M=8 and K=4, there are $2^{32}$ choices so it may take a considerable amount of time to go over these possibilities), and may exceed the channel coherence time. Instead of a brute force search for an optimal S, a relevant matrix S may be estimated.

In the case of K users and a goal of creating an equivalent channel H[f]S which is at least in part uncorrelated, each of the K time slots may be prioritized one user at a time to select column i of S such that signal power of user i is maximized in that slot. In this way, the equivalent channel H[f]S will have higher diagonal values than the non-diagonal values, which will decrease correlations as one user is getting prioritized at a time.

Figure 4:
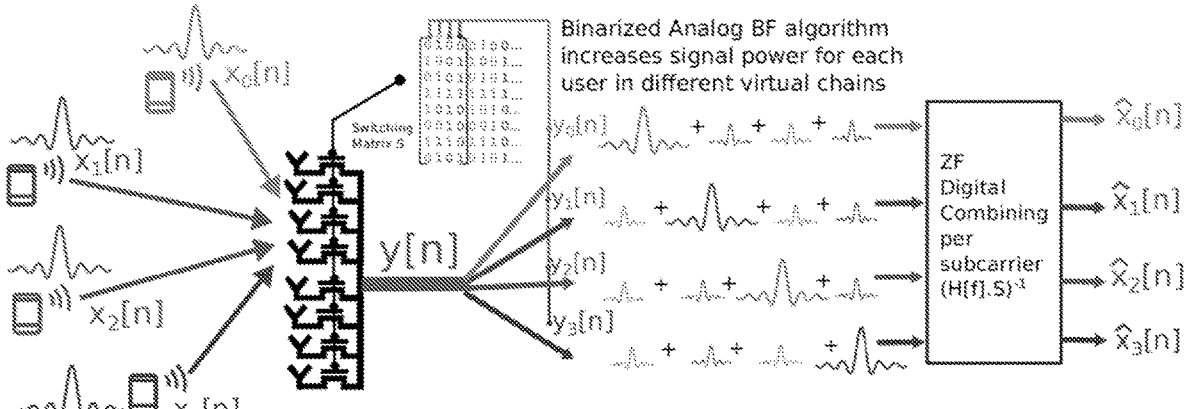
FIG. 4 depicts S matrix selection to implement binarized analog beamforming, in accordance with some embodiments.
Figure 5:
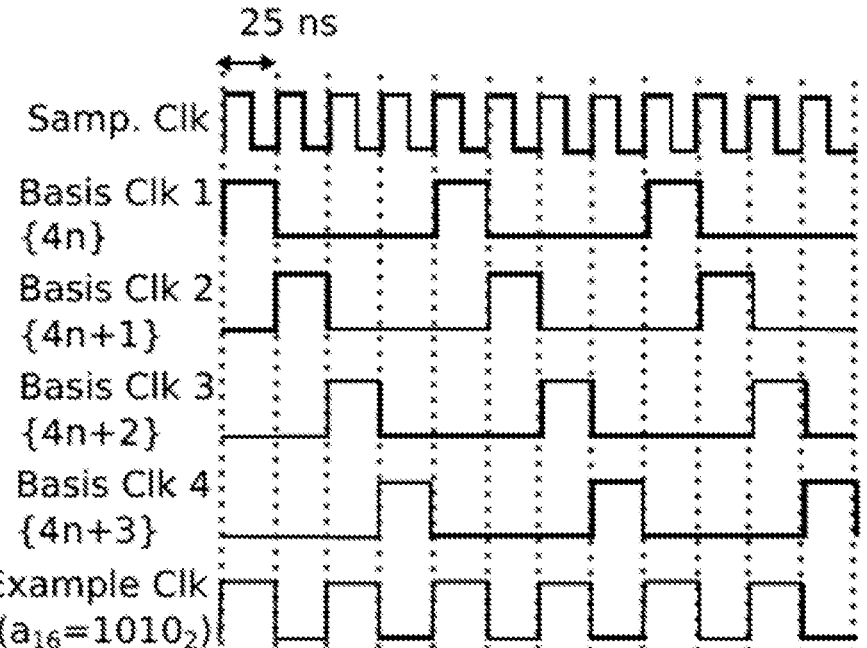
FIG. 5 depicts an example implementation of the basis clocks, in accordance with some embodiments.

To increase the signal power of a given user stream i for example, the theoretically exact way to do so would be to conjugate the user i's channels for each antenna, thus implementing analog beamforming, which would $c_0$-phase the user's signals received at each antenna, to give constructive combining gains. But as system 100 does not use accurate phase shifters but instead uses RF switches that toggle on-off, the phase control corresponds to only one-bit. But at the same time, there is a need to increase the signal power for user i. To that end, a maximal set of antennas may be turned "on" via the switches, such that the maximal set of on antennas add up constructively (which is referred to herein as binarized analog beamforming (BABF). FIG. 4 shows that S can be chosen to implement binarized analog beamforming (BABF). Table 1 below depicts an example implementation of the binarized analog beamforming (BABF) algorithm. The binarized analog beamforming (BABF) takes the analog beamforming solution and finds the closest representative of that in the binary RF switch implementable solution.

TABLE 1

| Algorithm 1 Binarized Analog Beamforming Algorithm (BABF) |
| --- |
| 1: $\phi = \pi/3$; |
| 2: for $1 \leq i \leq K$ do |
| 3:  for $1 \leq m \leq M$ do |
| 4:   $\tilde{s}_{i,m} = [0,0,...,0]_{1 \times M}$; |
| 5:   $g_{i,m} = H_i h^*_{i,m}$; |
| 6:   $\theta_{i,m} = \angle g_{i,m}$; |
| 7:   $\tilde{s}_{i,m}(m) = |\theta_{i,m}| < \phi$; |
| 8:   $score_{i,m}$ = Number of elements equal to 1 in $\tilde{s}_{i,m}$; |
| 9:  end for |
| 10: end for |
| 11: $\mathbb{S}$ := Set of all possible permutations of $score_{i,m}$, $1 \leq i \leq K$, $1 \leq m \leq M$ |
| 12: $l = 1$; |
| 13: Select $score^* \in \mathbb{S}$ that provides the $l^{th}$ highest score; |
| 14: $S = S^*$ (corresponding to $score^*$); |
| 15: if H(f)S is full rank then |
| 16:  S is the optimal switch configuration; |
| 17: else |
| 18:  $l = l + 1$; |
| 19:  Go to line 13; |
| 20: end if |

Using the binarized analog beamforming algorithm of Table 1, an optimum (e.g., best) uncorrelated equivalent channel matrix H[f]S may be achieved. To that end, the algorithm may go one antenna by one to calculate the number of other antennas whose phases lie within an acute angle (e.g., $\pi/3$ although other values may be used) of each other. Next, we select the group of in-phase antennas having the highest cardinality, since that would entail higher constructive combining gain and thus higher power for user i. This process may be repeated for each k-th user for k-th time slot to create a matrix S that enables maximally uncorrelated equivalent channel matrix.

For the system 100 to handle K users transmitting B bandwidth signals X, a single signal y may be sampled having KB bandwidth by utilizing an antenna array 102A-F with number of antennas M(>K) and switching sequences for switches 104A-F for each of the M antennas, and an extra K slots created due to higher sampling rate denoted by S to get the equation $$Y^{\mathscr{S}}[f] = (H[f]S)X[f], \tag{10}$$

wherein $Y^{\mathscr{S}}$ are the delay compensated K streams derived from y. The equivalent channel is represented by H[f]S, which is created due to the switching by the switches 104A-F. And, S is chosen such that the obtained K by K channel is at least in part uncorrelated, so that all of the K users can be served with a given SINR.

To recover individual data symbols for each user X[f] from the obtained interfered samples Y[f], a K×K beamforming matrix $V[f] = [v_1 v_2 \ldots v_k]^T$ is used that is a collection of K×1 beamforming vectors $v_i$, i=0,1, . . . K−1. To recover $x_i[f]$, we take the inner product of $v_i$ with Y[f]. To cancel out interference, a standard matrix inversion (e.g., a zero-forcing (ZF), a Maximum Mean Square (MMSE), and/or the like) combiner may be used. In system 100, the matrix V[f] selects pseudo inverse of H[f]S as the digital combiner matrix V. After utilizing the digital combiner, we get $$VY^{\mathscr{S}}[f] = pinv(H[f]S)(H[f]S)X[f] \approx X[f], \tag{11}$$

which allows us to remove the interference and recover each of the K symbols $X = [X_1, X_2, \ldots X_K]^T$ since this combining happens in the digital domain, arbitrary combinations for each frequency bin [f] may be performed, which allows for resilient wide-band operation, as well as accurate phase values so that the interference are cancelled perfectly.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1. An apparatus comprising:
a plurality of antennas;
an analog spreader coupled the plurality of antennas;
a radio frequency chain coupled to the analog spreader, wherein the radio frequency chain down converts and performs an analog-to-digital conversion to generate a stream; and
a digital despreader, wherein the digital despreader receives the stream output by the radio frequency chain and digitally inverts analog spreading caused by the analog spreader to generate one or more user streams.

Example 2. The apparatus of Example 1, wherein the analog spreader comprises a plurality of radio frequency switches.

Example 3. The apparatus of any of Examples 1-2, wherein each of the plurality of radio frequency switches toggles on or off a radio frequency signal obtained from one of the plurality of antennas.

Example 4. The apparatus of any of Examples 1-3, wherein the plurality of radio frequency switches are toggled on or off under the control of a control signal, wherein the control signal synchronizes the analog spreader, the radio frequency chain, and the digital despreader.

Example 5. The apparatus of any of Examples 1-4, wherein the digital despreader digitally inverts analog spreading caused by the analog spreader to generate the one or more user streams by at least deinterleaving interleaved samples to generate one or more user steams.

Example 6. The apparatus of any of Examples 1-5, wherein the radio frequency chain comprises a single radio frequency chain coupled to the plurality of antennas.

Example 7. The apparatus of any of Examples 1-6, wherein the radio frequency chain comprises a first single frequency chain coupled to a first set of the plurality of antennas and a second single frequency chain coupled to a second set of the plurality of antennas Example 8. The apparatus of any of Examples 1-7, wherein the plurality of antennas comprise a multiple input multiple output antenna array.

Example 9. The apparatus of any of Examples 1-8, wherein the multiple input multiple output antenna array is configured to enable beamforming, wherein the control signal turns on a first set of the antennas of the multiple input multiple output antenna array and turns off a second set of the antennas of the multiple input multiple output antenna array to enable reception of a first beam, such that the digital despreader outputs a first user stream, and wherein the control signal turns on the second set and turns off the first set to enable reception of a second beam, such that the digital despreader outputs a second user stream.

Example 10. The apparatus of any of Examples 1-9, wherein the radio frequency chain is virtualized, such that the radio frequency chain is shared among at least a portion of the plurality of antennas and at least a portion of the one or more user streams generated by the digital despreader.

Example 11. The apparatus of any of Examples 1-10, wherein each of the plurality of radio frequency switches is directly coupled to one of the plurality of antennas, wherein the direct coupling does not include an active component.

Example 12. The apparatus of any of Examples 1-11 wherein the radio frequency chain comprises a low noise amplifier coupled to a mixer that down coverts the outputs of the plurality of radio frequency switches, wherein the mixer is further coupled to an analog-to-digital converter that generates the stream including time interleaved samples.

Example 13. A method comprising:
receiving at least a radio frequency signal; and
controlling a plurality of antennas, an analog spreader coupled the plurality of antennas, a radio frequency chain coupled to the analog spreader, and a digital despreader, wherein the radio frequency chain down converts and performs an analog-to-digital conversion to generate a stream, and wherein the digital despreader receives the stream output by the radio frequency chain and digitally inverts analog spreading caused by the analog spreader to generate one or more user streams.

Example 14. The method of Example 13, wherein the analog spreader comprises a plurality of radio frequency switches.

Example 15. The method of any of Examples 13-14, wherein each of the plurality of radio frequency switches toggles on or off a radio frequency signal obtained from one of the plurality of antennas.

Example 16. The method of Examples 13-15, wherein the plurality of radio frequency switches are toggled on or off under the control of a control signal, wherein the control signal synchronizes the analog spreader, the radio frequency chain, and the digital despreader.

Example 17. The method of Examples 13-16, wherein the digital despreader digitally inverts analog spreading caused by the analog spreader to generate the one or more user streams by at least deinterleaving interleaved samples to generate one or more user steams.

Example 18. The method of Examples 13-17, wherein the radio frequency chain comprises a single radio frequency chain coupled to the plurality of antennas.

Example 19. The method of Examples 13-18, wherein the radio frequency chain comprises a first single frequency chain coupled to a first set of the plurality of antennas and a second single frequency chain coupled to a second set of the plurality of antennas Example 20. The method of Examples 13-19, wherein the plurality of antennas comprise a multiple input multiple output antenna array.

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it is used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. For example, the logic flows may include different and/or additional operations than shown without departing from the scope of the present disclosure. One or more operations of the logic flows may be repeated and/or omitted without departing from the scope of the present disclosure. Other implementations may be within the scope of the following claims.

What is claimed:

1. An apparatus comprising:
   a plurality of antennas;
   an analog spreader coupled the plurality of antennas;
   a radio frequency chain coupled to the analog spreader, wherein the radio frequency chain down converts and performs an analog-to-digital conversion to generate a stream; and
   a digital despreader, wherein the digital despreader receives the stream output by the radio frequency chain and digitally inverts analog spreading caused by the analog spreader to generate one or more user streams.

2. The apparatus of claim 1, wherein the analog spreader comprises a plurality of radio frequency switches.

3. The apparatus of claim 2, wherein each of the plurality of radio frequency switches toggles on or off a radio frequency signal obtained from one of the plurality of antennas.

4. The apparatus of claim 3, wherein the plurality of radio frequency switches are toggled on or off under control of a control signal, wherein the control signal synchronizes the analog spreader, the radio frequency chain, and the digital despreader.

5. The apparatus of claim 1, wherein the digital despreader digitally inverts analog spreading caused by the analog spreader to generate the one or more user streams by at least deinterleaving interleaved samples to generate one or more user streams.

6. The apparatus of claim 1, wherein the radio frequency chain comprises a single radio frequency chain coupled to the plurality of antennas.

7. The apparatus of claim 1, wherein the radio frequency chain comprises a first single frequency chain coupled to a first set of the plurality of antennas and a second single frequency chain coupled to a second set of the plurality of antennas.

8. The apparatus of claim 1, wherein the plurality of antennas comprise a multiple input multiple output antenna array.

9. The apparatus of claim 8, wherein the multiple input multiple output antenna array is configured to enable beamforming, wherein a control signal turns on a first set of the antennas of the multiple input multiple output antenna array and turns off a second set of the antennas of the multiple input multiple output antenna array to enable reception of a first beam, such that the digital despreader outputs a first user stream, and wherein the control signal turns on the second set and turns off the first set to enable reception of a second beam, such that the digital despreader outputs a second user stream.

10. The apparatus of claim 1, wherein the radio frequency chain is virtualized, such that the radio frequency chain is shared among at least a portion of the plurality of antennas and at least a portion of the one or more user streams generated by the digital despreader.

11. The apparatus of claim 2, wherein each of the plurality of radio frequency switches is directly coupled to one of the plurality of antennas, wherein the direct coupling does not include an active component.

12. The apparatus of claim 2, wherein the radio frequency chain comprises a low noise amplifier coupled to a mixer that down converts the outputs of the plurality of radio frequency switches, wherein the mixer is further coupled to an analog-to-digital converter that generates the stream including time interleaved samples.

13. A method comprising:

receiving at least a radio frequency signal; and controlling a plurality of antennas, an analog spreader coupled the plurality of antennas, a radio frequency chain coupled to the analog spreader, and a digital despreader, wherein the radio frequency chain down converts and performs an analog-to-digital conversion to generate a stream, and wherein the digital despreader receives the stream output by the radio frequency chain and digitally inverts analog spreading caused by the analog spreader to generate one or more user streams.

14. The method of claim 13, wherein the analog spreader comprises a plurality of radio frequency switches.

15. The method of claim 14, wherein each of the plurality of radio frequency switches toggles on or off a radio frequency signal obtained from one of the plurality of antennas.

16. The method of claim 15, wherein the plurality of radio frequency switches are toggled on or off under control of a control signal, wherein the control signal synchronizes the analog spreader, the radio frequency chain, and the digital despreader.

17. The method of claim 16, wherein the digital despreader digitally inverts analog spreading caused by the analog spreader to generate the one or more user streams by at least deinterleaving interleaved samples to generate one or more user streams.

18. The method of claim 13, wherein the radio frequency chain comprises a single radio frequency chain coupled to the plurality of antennas.

19. The method of claim 13, wherein the radio frequency chain comprises a first single frequency chain coupled to a first set of the plurality of antennas and a second single frequency chain coupled to a second set of the plurality of antennas.

20. The method of claim 14, wherein the plurality of antennas comprise a multiple input multiple output antenna array.

* * * * *